United States Patent [19]

Stewart

[11] Patent Number: 4,877,102

[45] Date of Patent: Oct. 31, 1989

[54] MULTI-WHEELED VEHICLE SUSPENSION AND DRIVE MECHANISM

[76] Inventor: Jeff Stewart, 1531 N. Drexel Rd., #74, West Palm Beach, Fla. 33417

[21] Appl. No.: 215,253

[22] Filed: Jul. 5, 1988

[51] Int. Cl.$^4$ .......................... B62D 61/06; B62K 5/02
[52] U.S. Cl. ...................................... 180/217; 180/350
[58] Field of Search ................... 280/111; 180/217, 72

[56] References Cited

U.S. PATENT DOCUMENTS

| | | | |
|---|---|---|---|
| 3,370,665 | 2/1968 | Stanaback | 280/111 |
| 3,781,031 | 12/1973 | Patin | 280/62 |
| 4,003,443 | 1/1977 | Boughers | 180/217 |
| 4,159,752 | 7/1979 | Kanno | 280/111 |
| 4,423,795 | 1/1984 | Winchell et al. | 280/111 |
| 4,469,188 | 9/1984 | Mita | 180/217 |
| 4,533,010 | 8/1985 | Harder | 280/111 |

Primary Examiner—Kenneth R. Rice

[57] ABSTRACT

A suspension and drive mechanism, especially applicable to motorcycle-type vehicles having two or more laterally mounted driven wheels, comprising a means for supporting the driven axle housing such that the vehicle body is pivotable about its longitudinal axis relative to the driven axle assembly, a means for transmitting power to the driven axle as the axle housing pivots relative to the vehicle body, a braking means capable of stopping the vehicle body pivoting motion, and a spring member which is coupled to both the vehicle body and the driven axle housing such that said spring member is deflected as the vehicle body pivots.

9 Claims, 5 Drawing Sheets

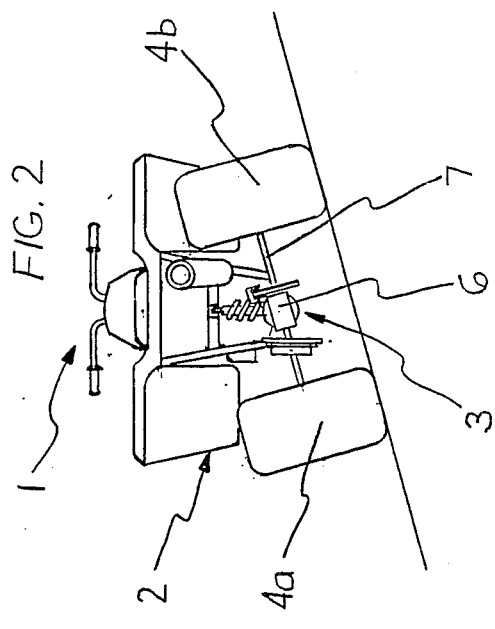
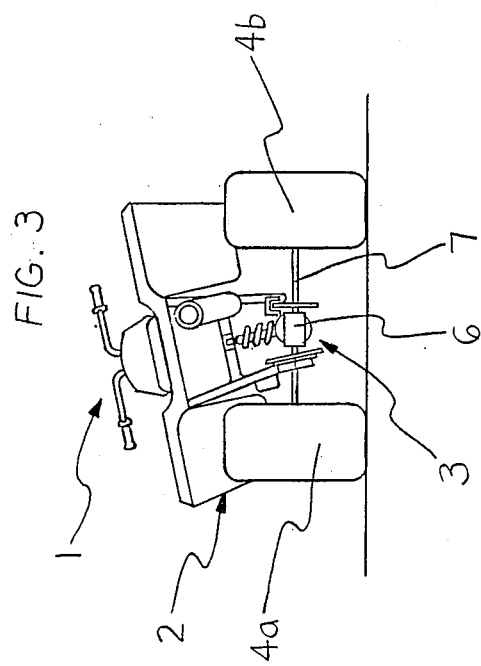
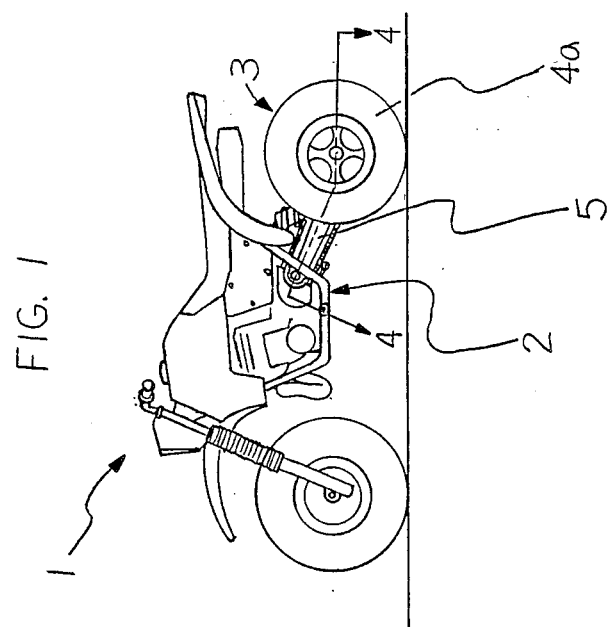

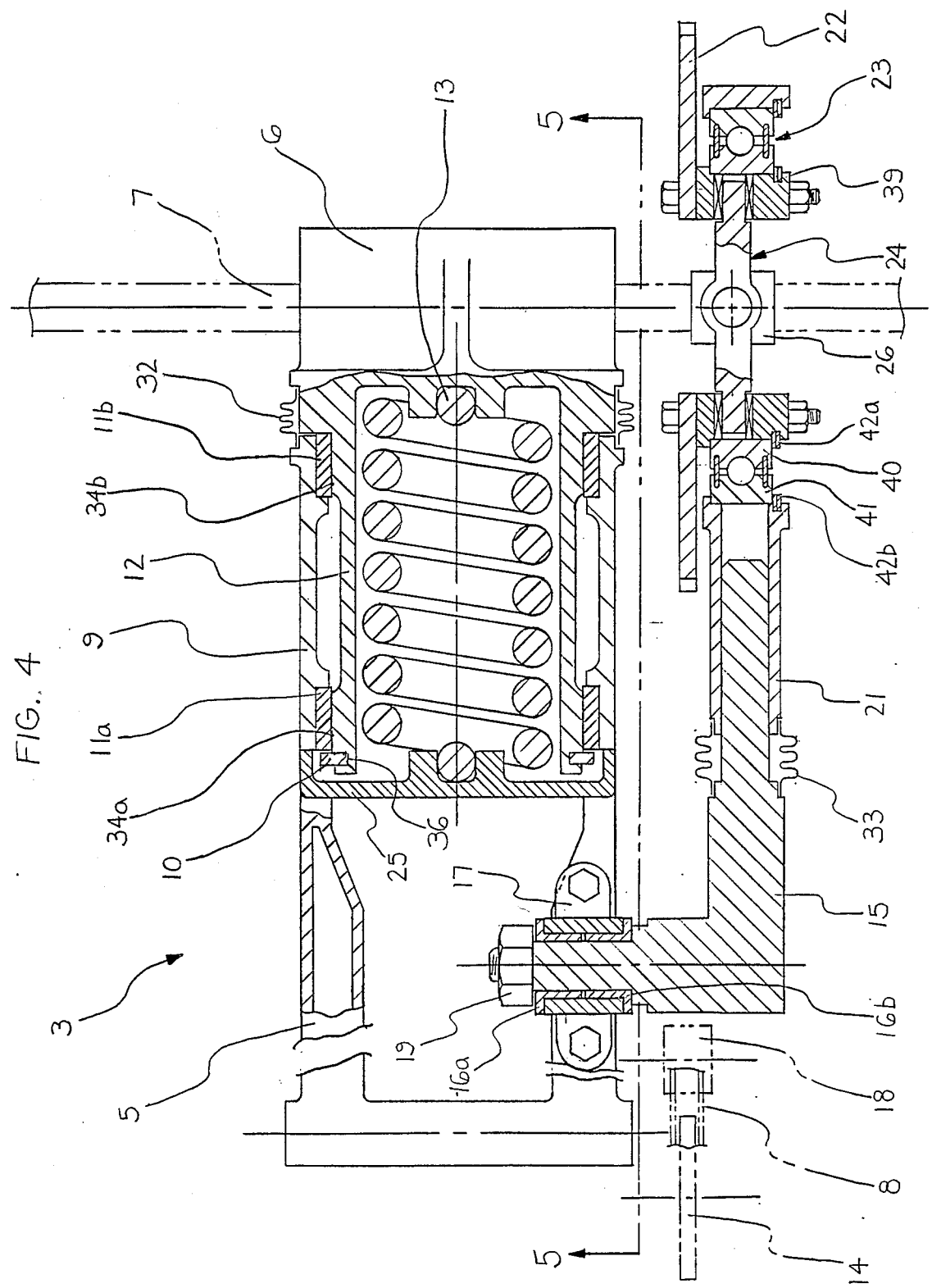

MULTI-WHEELED VEHICLE SUSPENSION AND DRIVE MECHANISM

BACKGROUND OF THE INVENTION

1. Field of the Invention

The invention relates to a multi-wheeled vehicle suspension and drive mechanism which is especially applicable to three and four wheeled motorcycles.

2. Description of the Prior Art

Three and four wheeled motorcycles currently in use, such as those generally referred to as All Terrain Vehicles, or ATV's, are inherently unstable when turning and while traversing inclined terrain due to the relatively narrow vehicle width and high center of gravity. This instability reduces vehicle manueverability and frequently results in over-turning of the vehicle and subsequent rider injury.

Current vehicles of this type are rear wheel driven and have either no rear suspension or a swing arm type suspension, which allows the rear axle assembly and swing arm to pivot as a unit about a transverse axis. These vehicle configurations do not enable the rider to shift the center of gravity of the vehicle about its longitudinal axis in order to reduce or eliminate over-turning moments. Thus, a vehicle suspension mechanism providing this capability is needed to improve vehicle manueverability and safety.

SUMMARY OF THE INVENTION

The invention relates to a suspension and drive mechanism, applicable primarily to motorcycle-type vehicles having two or more laterally mounted driven wheels, which allows the vehicle body to be pivoted about its longitudinal axis relative to the driven axle assembly in response to controlled shifts in the vehicle rider's weight. The invention comprises a means for supporting the driven axle housing such that the vehicle body may pivot relative to the driven axle housing, and a means for transmitting power to the driven axle thru its full range of motion relative to the vehicle body. The preferred embodiment of the invention comprises, in addition, a means for restoring the vehicle body to its neutral position when the rider-applied force is removed, and a means for stopping the pivoting motion at any position within its range.

The instability problem inherent in vehicles in the category of 'Prior Art' results primarily from the centrifugal force induced when turning the vehicle and the transverse component of the gravitational force acting upon the vehicle as it transverses an inclined surface. Both of these forces act at the relatively high center of gravity of the vehicle/rider combination and result in a moment which tends to tip or over-turn the vehicle. A means for shifting the vehicle body position would allow a significant reduction in this over-turning moment. It is an object of the invention to provide a mechanism with such a capability in order to improve vehicle manueverability and safety. Further objects and advantages of the invention will become apparent from a consideration of the drawings and description.

BRIEF DESCRIPTION OF THE DRAWINGS

FIG. 1 is a side elevation showing one type of vehicle incorporating the invention.

FIGS. 2 and 3 are rear elevations illustrating the intended vehicle body and rear axle positions for a vehicle incorporating the invention while traversing an incline and turning, respectively.

FIG. 4 is a sectional view, along section 4—4 of FIG. 1, showing an embodiment of the suspension and drive mechanism.

DRAWING REFERENCE NUMERALS

Figure 5:
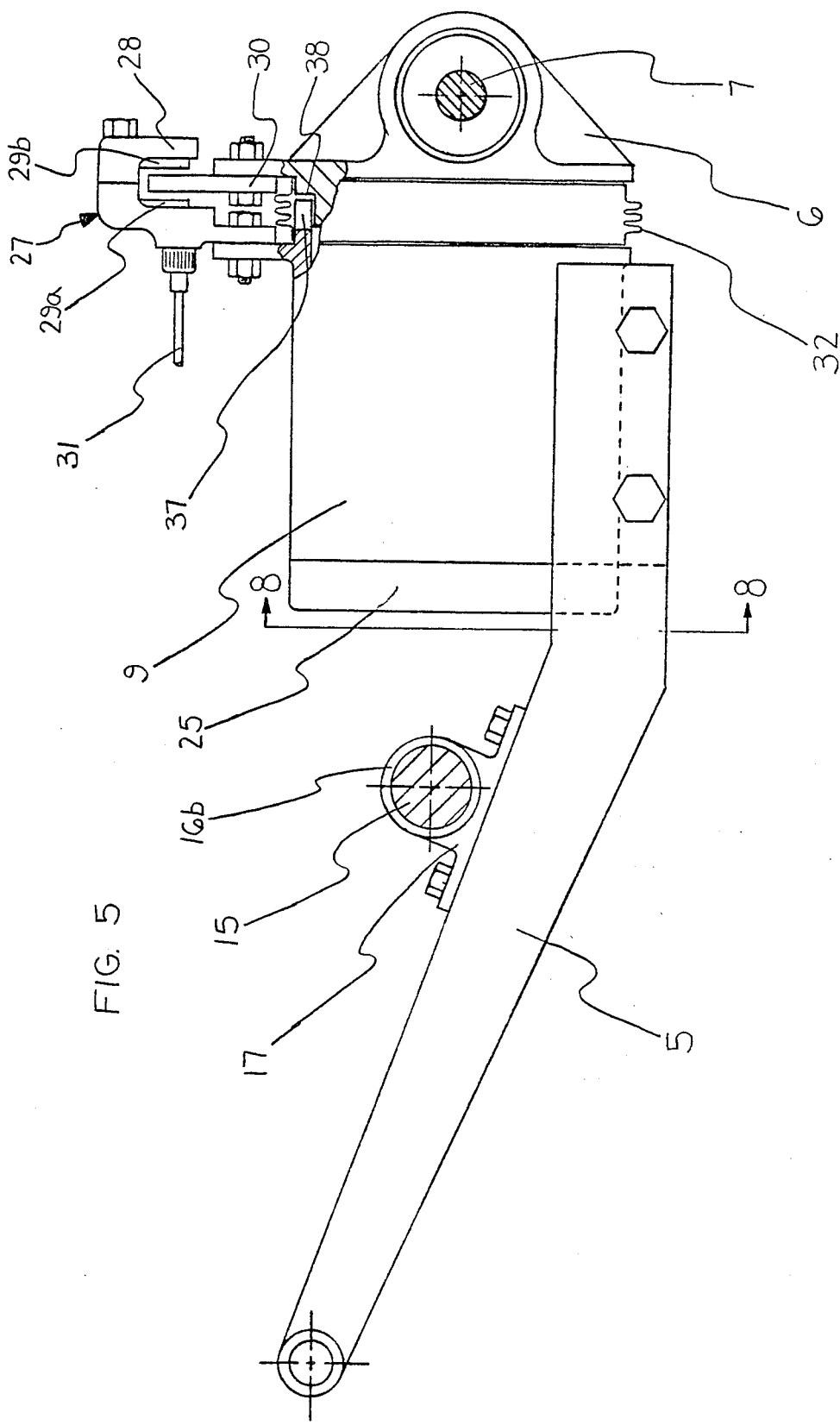
FIG. 5 is a sectional view, along section 5—5 of FIG. 4, showing a side elevation of the swing arm, axle housing, axle housing support, and brake assembly.

| | |
|---|---|
| 1 | vehicle |
| 2 | vehicle body |
| 3 | rear axle assembly |
| 4a & b | rear wheels |
| 5 | swing arm |
| 6 | axle housing |
| 7 | rear axle |
| 8 | chain |
| 9 | axle housing support |
| 10 | retaining ring for 12 |
| 11a & b | journal bearings |
| 12 | extension of 6 |
| 13 | torsion spring |
| 14 | driving sprocket |
| 15 | pivot arm |
| 16a & b | bushings of 17 |
| 17 | bushing housing |
| 18 | chain tensioner |
| 19 | retaining nut for 15 |
| 20 | anti-rotation pin |
| 21 | bearing carrier |
| 22 | driven sprocket |
| 23 | ball bearing |
| 24 | universal joint |
| 25 | cover of 9 |
| 26 | drive coupling |
| 27 | brake assembly |
| 28 | brake housing |
| 29a & b | brake pads |
| 30 | brake disc segment |
| 31 | control cable |
| 32 | flexible seal for 6 & 9 |
| 33 | flexible seal for 15 & 21 |
| 34a & b | bearing surfaces of 12 |
| 35 | slot of 15 |
| 36 | groove for 10 |
| 37 | tang of 9 |
| 38 | slot of 6 |
| 39 | connecting ring for 22 & 23 |
| 40 | inner race of 23 |
| 41 | outer race of 23 |
| 42a & b | retaining rings for 40 & 41 |

DESCRIPTION AND OPERATION OF THE PREFERRED EMBODIMENT

Description

FIGS. 1, 2, and 3 show a vehicle 1 incorporating the invention into its rear suspension. The vehicle shown is a three wheeled motorcycle of the type generally referred to as All Terrain Vehicles, or ATV's. The invention is also applicable to other types of vehicles, including four wheeled ATV's with independent front suspension, multi-wheeled human powered cycles, and other similar vehicles with two or more laterally mounted driven wheels. In its preferred embodiment, the invention is easily incorporated into both existing vehicles and new vehicle designs. The vehicle 1 comprises vehicle body 2 and rear axle assembly 3. The vehicle body 2 compises the frame, engine, seat, fuel tank, steering mechanism, swing arm 5, and axle housing support 9. The front wheel on three wheeled vehicles is also part of vehicle body 2. The rear axle assembly 3 comprises the axle housing 6, rear axle 7, and rear wheels 4a and 4b.

The sectional view in FIG. 4 and the side elevation in FIG. 5 show the overall vehicle suspension mechanism. The rear axle 7 is rotatably supported in axle housing 6. Extension 12 of the axle housing 6 has integral circumferential bearing surfaces 34a and 34b, which have a common centerline which is perpendicular to the centerline of the rear axle 7. Bearing surfaces 34a and 34b engage journal bearings 11a and 11b, which are installed into axle housing 9 with a radial interference fit and positioned by integral axial stops. Bearings 11a and 11b are located on a common centerline which is parallel to the vehicle longitudinal axis. Retaining ring 10 is installed into groove 36 in the forward end of extension 12 which extends beyond journal bearing 11a. Flexible seal 32 engages both axle housing 6 and axle housing support 9.

Figure 8:
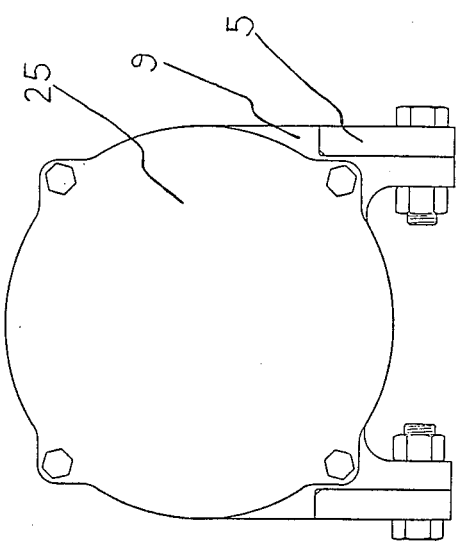
FIG. 8 is a sectional view, along section 8—8 of FIG. 5, showing the attachment of the axle housing support to the swing arm and the cover.

The axle housing suppot 9 is bolted to swing arm 5 as shown in FIGS. 5 and 8. The support 9 would be attached directly to the vehicle frame (not shown) in configurations without a swing arm. As shown in FIG. 4, one end of torsion spring 13 engages axle housing 6 and the other end engages cover 25, which is bolted to axle housing support 9 as shown in FIG. 8. Tang 37, which is integral with support 9, engages the circumferential slot 38 in axle housing 6 as shown in FIG. 5.

Figure 6:
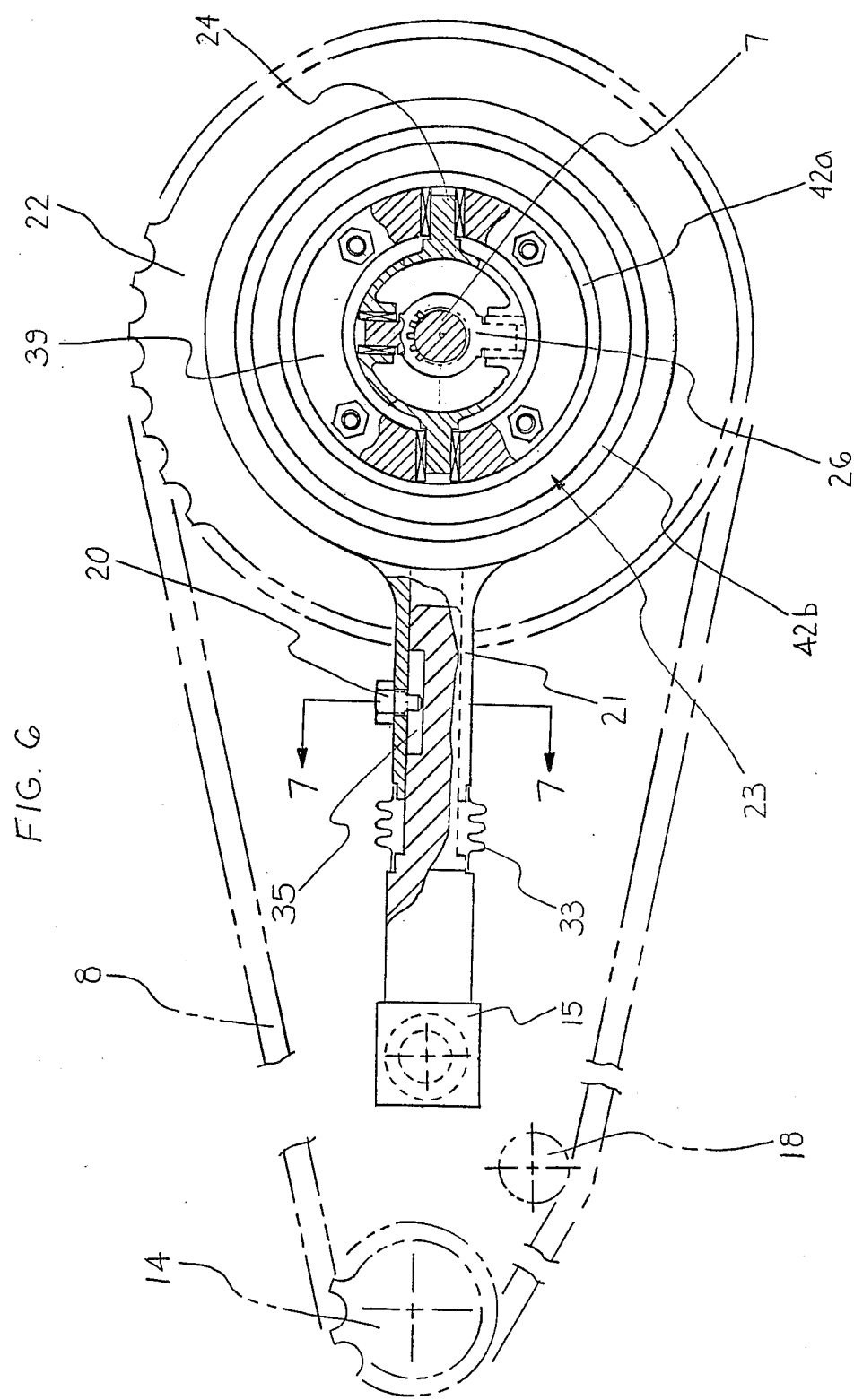
FIG. 6 is a side elevation of the drive mechanism.

The overall vehicle drive mechanism is shown in FIGS. 4 and 6. Driving sprocket 14 is attached to the output shaft of the vehicle engine (not shown), which is affixed to the vehicle body 2. Chain 8 couples driving sprocket 14 to driven sprocket 22. Universal joint 24 connects driven sprocket 22 to the drive coupling 26, which has a splined engagement with rear axle 7. Chain tensioner 18 has its stationary member (not shown) attached to the swing arm 5. The tensioning member of chain tensioner 18 is in contact with chain 8.

Figure 7:
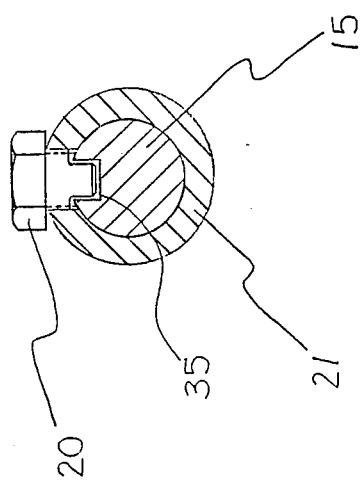
FIG. 7 is a sectional view, along section 7—7 of FIG. 6, showing the engagement of the bearing carrier, pivot arm, and anti-rotation pin.

The driven sprocket 22 is bolted to connecting ring 39. The rotating inner race 40 of ball bearing 23 is assembled onto connecting ring 39. The stationary outer race 41 of bearing 23 is supported by bearing carrier 21, which has sliding engagement in the vehicle longitudinal direction with pivot arm 15. Bearing retaining rings 42a and 42b are installed into grooves in connecting ring 39 and bearing carrier 21, respectively. Flexible seal 33 engages both pivot arm 15 and bearing carrier 21. A threaded anti-rotation pin 20 is installed into bearing carrier 21 with its pin portion engaging a longitudinal slot 35 in pivot arm 15, as shown in FIGS. 6 and 7. Pivot arm 15 is rotatably supported by bushings 16a and 16b within bushing housing 17. Bushing housig 17 is bolted to swing arm 5 with its axis oriented in the transverse direction. Retaining nut 19 is installed onto the threaded end of pivot arm 15 and bottomed on a shoulder of pivot arm 15.

The brake assembly 27, shown in FIG. 5, has its brake housing 28 bolted to axle housing support 9. Brake disc segment 30 is attached to axle housing 6 and positioned between, and parallel to, brake pads 29a and 29b, which are supported by brake housing 28. A control cable 31 connects the brake assembly 27 to an actuation mechanism (not shown).

Operation:

The vehicle suspension and drive mechanism, shown in FIGS. 1, 2, and 3, allows the vehicle body 2 to be pivoted about its longitudinal axis relative to the rear axle assembly 3 in response to controlled shifts in the vehicle rider's weight. This capability enables the rider to reduce the over-turning moments which are inherent in this type of vehicle, thus improving vehicle stability, manueverability, and safety.

FIG. 2 illustrates the intended position of the vehicle body 2 as the vehicle 1 traverses an inclined surface. As shown, the invention allows a controlled shift in the rider's weight to pivot the vehicle body 2 about its longitudinal axis relative to the rear axle assembly 3. This capability allows the rear wheels 4a and 4b to follow the incline, while the longitudinal plane of symmetry of the vehicle body is positioned substantially co-planar with the vehicle body and rider gravitational forces, which act in the vertial direction thru their respective centers of gravity. This orientation eliminates the over-turning moment which results when the vehicle body plane of symmetry remains perpendicular to the incline.

FIG. 3 illustrates the intended position of the vehicle body 2 as the vehicle 1 performs a left-hand turning manuever. The invention allows the rider to pivot the vehicle body 2 in the direction of the center of the radius of the turn. This orientation improves vehicle stability by reducing the over-turning movement resulting from the centrifugal force, and by increasing the stabilizing moment resulting from the gravitational force.

In both FIGS. 2 and 3, the vehicle body position is controlled in a manner similar to that used in riding a two wheeled motorcycle or bicycle. This capability to shift vehicle body position in response to varying riding conditions and terrain results in improved stability, manueverability, and safety.

The overall suspension mechanism which provides the vehicle body pivoting capability is shown in FIGS. 4 and 5. Journal bearings 11a and 11b provide rotatable support for bearing surfaces 34a and 34b of extension 12 such that axle housing 6 is free to pivot relative to the vehicle longitudinal axis. Longitudinal motion of the axle housing 6 within axle housing support 9 is restricted in the forward direction by contact between extension 12 and the axial face of bearing 11b. Groove 36 positions the retaining ring 10 such that it restricts motion of axle housing 6 in the aft direction witout restricting rotation. Contact surfaces of journal bearings 11a and 11b are lubricated by grease or other suitable substance (not shown) which is contained in the adjacent housing support cavity. Contamination of the contact surfaces by dirt, sand, etc, is prevented by flexible seal 32. Although FIG. 5 shows the invention with the centerline of extension 12 in the same vertical plane as the axle centerline, it may be advantageous to shift the extension centerline upward. This would reduce the distance between the center of gravity of vehicle body 2 and its center of rotation, and thus reduce the moment required for the rider to pivot the vehicle body 2. The swing arm 5 positions the axle housing support 9 relative to the vehicle body 2 as shown in FIGS. 5 and 8. In configuration without a swing arm, the vehicle frame (not shown) serves this function.

Torsion spring 13, which is coupled to both the axle housing 6 and cover 25, is deflected circumferentially as the axle housing 6 rotates relative to its support 9. This deflection results in a moment applied to cover 25 and support 9 in proportion to the angle of rotation and in a direction opposite the rotation. This moment resists the pivoting motion and stabilizes the vehicle 1 by reducing vehicle body rotation due to minor, unintentional shifts in the rider's weight. This moment also improves vehicle stability by restoring the vehicle body 2 to its neutral position when such forces are removed. The use of torsion spring 13 may not be beneficial on four wheeled vehicles with indepedent front suspension because of the similar effect provided by the front suspension system. Rotation between axle housing 6 and support 9 beyond design limits is prevented by circumferential contact between tang 37 and the ends of slot 38, both shown in FIG. 5.

The overall drive mechanism, shown in FIGS. 4 and 6, transmits power to the rear axle 7 as it pivots relative to the vehicle body 2. Power is transmitted from the driving sprocket 14 to the driven sprocket 22 by the chain 8. A chain tensioner 18 maintains proper tension in chain 8 thru the full range of vehicle body positions. A universal joint 24 provides smooth, continuous power transmission from the driven sprocket 22 to the rear axle 7, via the drive coupling 26, thru the full range of relative angles between the axle and driven sprocket axes of rotation. The drive coupling 26 is splined to the rear axle 7 to allow relative motion along the axle centerline as the rear axle assembly 3 rotates.

Driven sprocket 22 is supportd by connecting ring 39, ball bearing 23, bearing carrier 21, and pivot arm 15 such that it rotates in the same plane as the driving sprocket 14. Bearing retaining rings 42a and 42b position and retain bearing races 40 and 41 in connecting ring 39 and bearing carrier 21, respectively. Pivot arm 15 is supported by bushings 16 and 16' within bushing housing 17 such that it is free to rotate about a transverse axis. Retaining nut 19 positions pivot arm 15 in the transverse direction without restricting its rotation. The bearing carrier 21 is free to translate along the pivot arm 15 only in a direction essentially parallel to the vehicle longitudinal axis. Grease or other suitable substance (not shown) is used to lubricate the sliding surfaces of both pivot arm 15 and bearing carrier 21 to reduce wear. A flexible seal 33 prevents contamination of these surfaces by dirt, sand, etc. Rotation of the bearing carrier 21 about its axis of translation is prevented by threaded anti-rotation pin 20, shown in FIGS. 6 and 7, the pin portion of which has a close fit with slot 35. The combination of bearing support translation and pivot arm rotation allows the driven sprocket 22 to follow axle motion with very little resistance, while also accomodating axial tolerances and deflections in the system which would otherwise cause binding.

The brake assembly 27, shown in FIG. 5, provides the vehicle rider with the capability to quickly stop vehicle body rotation. The brake pads 29 and 29' are positioned by brake housing 28 and actuated via a control cable 31 by an actuation mechanism (not shown) which is controlled by the rider. When actuated. brake pads 29a and 29b contact the brake disc segment 30, which rotates relative to the brake housing 28, and lock the vehicle body 2 in its position. The type of actuation mechanism and its location should be selected to provide optimum rider convenience and safety of operation.

Although the above description contains many specificities, these should not be construed as limitations on the scope of the invention, but rather as an exemplification of one preferred embodiment thereof. Many variations of the invention are possible. Some examples of these variations are:

incorporation of the invention into the front suspension of a from wheel drive or four wheel drive vehicle;

replacement of the axle housig support journal bearings with anti-friction bearings;

elimination of the journal bearings, allowing direct contact between the axle housing and axle housng support, to reduce cost;

replacement of the chain with a drive belt;

substitution of an axially-deflected spring system for the torsion spring;

replacement of the pivot arm and bearing carrier with a slider mechanism allowing motion primarily in the vertical direction;

substitution of a two piece axle housing/extension assembly for the integral axle housing/extension member.

addition of bushings or anti-friction bearings to reduce sliding friction between axle and coupling splines;

addition of bushings or ati-friction bearings to reduce sliding friction between pivot arm and bearing carrier;

relocation of the bushing housing, which supports the pivot arm, from the swing arm to the axle housing support;

integration of the bushing housing into the swing arm or the axle housing support;

elimination of the bushings from the bushing housing, allowing direct contact between pivot arm and housing, to reduce cost;

replacement of the threaded anti-rotation pin, which serves as anti-rotation feature for the bearing carrier, with an anti-rotation key to increase contact area;

substitution of threadd retaining nuts for retaining rings, and vice-versa;

reversal of the locations of the brake housing and the brake disc segment;

elimination of contact surface lubrication to reduce cost;

use of a similar mechanism in other applications wherein angular misalignment occurs between a shaft and a driven or driving member;

The invention contemplates these and all other configurations which accomplish an equivalent result.

I claim:

1. A suspension and drive mechanism for a vehicle having two or more laterally mounted driven wheels, comprising:
    a. an axle housing which rotatably supports a driven axle;
    b. an axle housing support which is attached to the vehicle body;
    c. said axle housing being supported by said axle housing support such that said vehicle body is pivotable about the vehicle longitudinal axis relative to said axle housing;
    d. a driven member to which rotational energy is transmitted from a driving member, said driving member being: connected to said vehicle body; rotatable about a transverse axis; and, offset from the vehicle longitudinal axis;
    e. a means for supporting said driven member relative to said vehicle body such that: the plane of rotation of said driven member is essentially coplanar with the plane of rotation of said driving member; and, said driven member is translatable in an essentially vertical direction; and, f. a coupling means which connects said driven member to said driven axle such that rotational energy is transmitted to said driven axle over a range of relative angles between the axes of rotation of said driven member and said driven axle, said coupling means being translatable along said driven axle.

2. The suspension and drive mechanism of claim 1, further comprising a braking means capable of stopping the pivoting motion of said vehicle body relative to said axle housing.

3. The suspension and drive mechanism of claim 2 wherein said braking means comprises:
   a. at least one brake pad;
   b. a brake housing;
   c. a brake disc;
   d. an actuation mechanism
   e. said brake housing and said brake disc being attached to said vehicle such that the one rotates relative to the other in a common plane as said vehicle body pivots relative to said axle housing;
   f. said brake pad being supported by said brake housing such that said brake pad contacts said brake disc as said actuation mechanism is operated.

4. The suspension and drive mechanism of claim 1, further comprising at least one spring member having its one end coupled to said vehicle body and its other end coupled to said axle housing such that said spring member is deflected as said vehicle body pivots relative to said axle housing.

5. The suspension and drive mechanism of claim 4, further comprising a braking means capable of stopping the pivoting motion of said vehicle body relative to said axle housing.

6. The suspension and drive mechanism of claim 4 wherein said spring member comprises a torsion spring.

7. The suspenson and drive mechanism of claim 1 wherein said coupling means which connects said driven member to said driven axle comprises a universal joint mechanism.

8. The suspension and drive mechanism of claim 1 wherein said means for supporting said driven member comprises:
   a. a bearing having its rotating race secured to said driven member on a common centerline;
   b. a bearing carrier which is attached to the stationary race of said bearing, said carrier having at least one sliding contact surface, the axis of which is oriented substantially perpendicular to the axis of rotation of said bearing;
   c. a pivot arm which is attached to said vehicle body such that said pivot arm is rotatable relative to said vehicle body about a transverse axis, said pivot arm having at least one sliding contact surface, the axis of which is oriented substantially parallel to the longitudinal axis of said vehicle body;
   d. said bearing carrier being assembled to said pivot arm such that the respective sliding conact surfaces are engaged, said bearing carrier being oriented circumferentailly and positioned transversely such that the plane of rotation of said bearing is substantially coplanar to that of said driving member;
   e. An anti-rotation member which engages said bearing support and said pivot arm such that the relative circumferential orientation is maintained.

9. The suspension and drive mechanism of claim 8 wherein said coupling means which connects said driven member to said driven axle comprises a universal joint mechanism.

* * * * *